Oct. 16, 1956　　　W. H. BEAUBIEN　　　2,767,371
SATURABLE REACTOR
Filed June 18, 1952
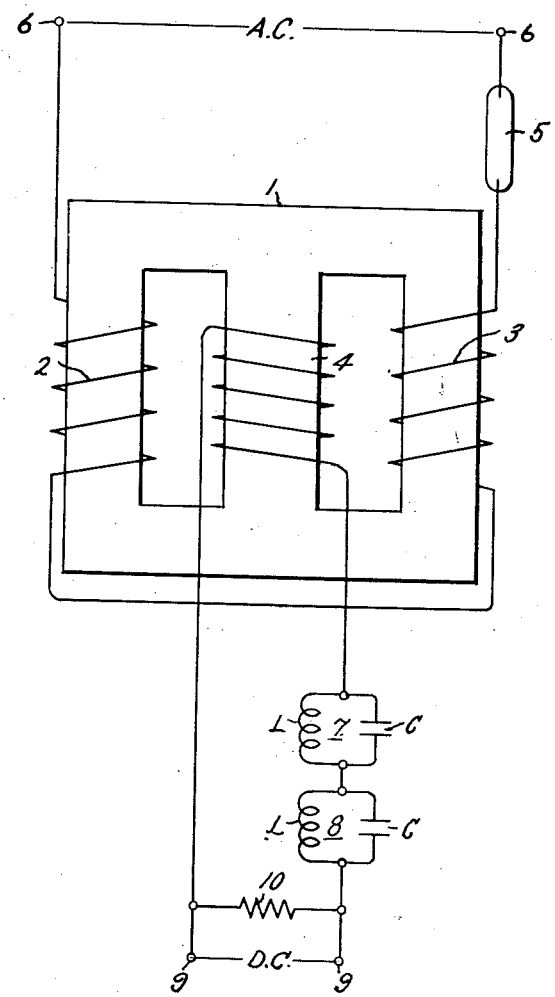
Inventor:
William H. Beaubien,
by Claude H. Miti
His Attorney.

United States Patent Office 2,767,371
Patented Oct. 16, 1956

2,767,371

SATURABLE REACTOR

William H. Beaubien, Lynn, Mass., assignor to General Electric Company, a corporation of New York Application June 18, 1952, Serial No. 294,245

2 Claims. (Cl. 323—89)

My invention relates to electric circuit control apparatus of the saturable reactor type.

It has been found that saturable reactors, and particularly reactors of the type having two alternating current windings in series inherently have a poor output wave shape in that the ratio of peak to effective value is substantially greater than unity. It is known that this poor wave shape is due in large part to alternating current at harmonic frequencies induced in the direct current saturating winding and reflected into the alternating current winding. It has been previously suggested that alternating currents induced in the direct current winding be attenuated by means of a choke coil connected in series circuit relation with the direct current winding. However, if such a coil is arranged to provide sufficient attenuation to provide an output current wave having a peak to effective rates approaching unity (i. e., a substantially rectangular output wave), the coil becomes so large as to be impractical, the coil being several times the size of the saturable reactor.

Accordingly, therefore, it is an object of my invention to provide, in a saturable reactor, means for improving the wave form which is small in size, light in weight and inexpensive to manufacture.

It is a further object of my invention to provide, in a saturable reactor, means for suppressing alternating currents induced in the direct current saturating winding.

It is a more particular object of my invention to provide a series coil type of saturable reactor having an output wave form of substantially rectangular configuration.

In carrying out my invention in one form I connect in series circuit relation with the direct current saturating winging of a saturable reactor frequency sensitive impedance means adjusted to present maximum impedance to only alternating currents of one or more predetermined frequencies. Specifically, in a reactor of the type having two alternating current coils in series disposed so that induced currents of fundamental frequency are cancelled out in the direct current winding, I connect in series circuit relation with the direct current winding one or more tuned chokes in the form of parallel resonant circuits tuned to even harmonic frequencies. I find that such chokes, and particularly the second harmonic choke, has a very marked effect in producing an output wave of substantially rectangular form. Such a reactor is found especially suitable for use as a ballast impedance in series with electric discharge lamps and the like.

My invention itself will be more fully understood and its various objects and advantages further appreciated by referring now to the following detailed specification taken in conjunction with the drawing, the single figure of which is a schematic circuit diagram of a saturable core reactor connected in series circuit relation with an electric discharge lamp and embodying my invention.

Referring now to the drawing, I have shown a saturable reactor including a three-legged magnetizable core 1 having wound upon its outer legs a pair of alternating current reactor windings 2 and 3 and upon its center leg a direct current saturating or control winding 4. The alternating current windings 2 and 3 are connected in series circuit relation with each other and with an electric discharge lamp 5 to a pair of alternating electric current supply terminals 6, and are wound on the reactor core so that they are in opposing inductive relation with respect to the saturating winding 4. It will be understood by those skilled in the art that the electric discharge lamp 5 is only illustrative of any suitable load device adapted to be controlled by the reactor.

The direct current saturating winding 4 is connected in series circuit relation with a pair of parallel resonant tuned circuits 7 and 8 to a pair of direct current supply terminals 9, and across the terminals 9 there is connected an alternating current bypass impedance shown as a resistor 10. Each parallel resonant tuned circuit 7 and 8 consists of an inductance L connected in parallel circuit relation with a capacitor C. The resonant circuit 7 is tuned to the second harmonic of the source, or fundamental frequency and the resonant circuit 8 is tuned to the fourth harmonic of the source frequency. It will be evident to those skilled in the art that, if desired, additional parallel resonant circuits may be similarly connected in series circuit relation and tuned to other harmonics of the source frequency.

It will now be understood that, in operation, when alternating current of a predetermined fundamental frequency is applied to the supply terminals 6, no alternating current of fundamental frequency is induced in the direct current winding 4 because of the opposing inductive relation of the alternating current windings 2 and 3 with respect to the direct current winding. This is due to the fact that at any instant the alternating current windings 2 and 3 tend to force flux in opposite directions through the center core leg upon which the direct current winding is wound. This disposition of the windings, however, results in an appreciable induced voltage of second harmonic frequency in the direct current winding 4, along with less appreciable voltage components of other even harmonic frequencies. In the absence of attenuation of such harmonic currents in the direct current winding 4, harmonic voltages are reflected back by transformer action from the winding 4 to the alternating current windings 2 and 3 and cause peaking of the output wave. In accordance with my invention, however, the induced currents of even harmonic frequency which tend to circulate through the winding 4 and the bypass resistor 10 are very sharply attenuated by the tuned choking action of the parallel resonant circuits 7 and 8. In the particular reactor illustrated it has been found unnecessary to attenuate alternating currents of frequency other than selected even harmonic frequencies and particularly the second harmonic. By thus neglecting induced currents of other than the selected frequency I am able to avoid the use of a large, unwieldy and expensive untuned choke coil and at the same time to accomplish more effectively the suppression of undesired alternating currents in the saturating winding, with the result that the output wave form of the reactor is substantially rectangular in configuration.

While I have shown and described only a preferred embodiment of my invention by way of illustration many modifications will occur to those skilled in the art, and I therefore wish to have it understood that I intend in the appended claims to cover all such modifications as fall within the true spirit and scope of my invention.

What I claim as new and desire to secure by Letters Patent of the United States is:

1. In a saturable reactor having an output current wave form of substantially rectangular configuration when connected in circuit with a load device to a source of alternating electric current supply of predetermined frequency, a magnetizable core, a pair of alternating current windings on said core adapted to be connected in series circuit relation to said source of alternating electric current supply of predetermined freqency, a direct current winding on said core, said alternating current windings being deposed in an opposing inductive relation with said direct current winding a parallel resonant circuit tuned to a predetermined even harmonic of said source frequency, and impedance means connecting said parallel resonant circuit in closed series circuit relation with said direct current winding.

2. In a saturable reactor having an output current wave form of substantially rectangular configuration when connected in circuit with a load device to a source of alternating electric current supply of predetermined frequency, a magnetizable core, a pair of alternating current windings on said core adapted for connection in series circuit relation to said source of alternating electric current supply of predetermined frequency, a direct current saturating winding on said core, said alternating current windings being disposed in opposing inductive relation with said direct current winding, and a parallel resonant circuit connected in series circuit relation with said direct current winding and tuned to the second harmonic of said source frequency.

References Cited in the file of this patent

UNITED STATES PATENTS

| 2,661,453 | Hemingway et al | Dec. 1, 1953 |

FOREIGN PATENTS

| 537,930 | Great Britain | July 14, 1941 |